(12) United States Patent
Yanagisawa

(10) Patent No.: US 11,694,242 B2
(45) Date of Patent: Jul. 4, 2023

(54) WEARABLE TERMINAL, INFORMATION PROCESSING TERMINAL, AND PRODUCT INFORMATION DISPLAY METHOD

(71) Applicant: Mercari, Inc., Minato-ku (JP)

(72) Inventor: Satoshi Yanagisawa, Minato-ku (JP)

(73) Assignee: MERCARI, INC., Minato-Ku (JP)

( * ) Notice: Subject to any disclaimer, the term of this patent is extended or adjusted under 35 U.S.C. 154(b) by 70 days.

(21) Appl. No.: 16/525,825

(22) Filed: Jul. 30, 2019

(65) Prior Publication Data

US 2020/0202397 A1   Jun. 25, 2020

(30) Foreign Application Priority Data

Dec. 19, 2018   (JP) .................................. 2018-237226

(51) Int. Cl.
| | |
|---|---|
| *G06Q 30/00* | (2023.01) |
| *G06Q 30/0601* | (2023.01) |
| *G06F 3/01* | (2006.01) |
| *G06V 20/20* | (2022.01) |
| *G06V 40/20* | (2022.01) |

(52) U.S. Cl.
CPC ......... *G06Q 30/0601* (2013.01); *G06F 3/017* (2013.01); *G06V 20/20* (2022.01); *G06V 40/28* (2022.01)

(58) Field of Classification Search
CPC ...... G06Q 30/0601–0645; G06Q 30/08; G06F 3/017; G06K 9/00355; G06K 9/00671
USPC ................................. 705/26.1–27.2
See application file for complete search history.

(56) References Cited

U.S. PATENT DOCUMENTS

| | | | | |
|---|---|---|---|---|
| 8,577,053 | B1 * | 11/2013 | Simon .................... | H04R 3/005 381/82 |
| 9,262,780 | B2 * | 2/2016 | Petrou ..................... | G06Q 30/06 |
| 9,898,742 | B2 * | 2/2018 | Higgins ................. | G06Q 30/00 |
| 10,546,204 | B1 * | 1/2020 | Kumar ............... | G06K 9/00268 |
| 10,838,507 | B2 * | 11/2020 | Harris ................ | G06K 9/00268 |

(Continued)

FOREIGN PATENT DOCUMENTS

| | | |
|---|---|---|
| JP | 2018022453 A | 2/2018 |
| WO | WO 2015-107625 A1 | 7/2015 |

OTHER PUBLICATIONS

List, Jenny, Move a robotic hand with your nerve impulses, Dec. 31, 2016, hackaday.com, accessed at [https://hackaday.com/2016/12/31/move-a-robotic-hand-with-your-nerve-impulses/] (Year: 2016).*

*Primary Examiner* — Michael Misiaszek
*Assistant Examiner* — Lindsey B Smith
(74) *Attorney, Agent, or Firm* — Sterne, Kessler, Goldstein & Fox P.L.L.C.

(57) ABSTRACT

There is provided a wearable terminal which is capable of performing a transaction using information about a product viewed by a user. A wearable terminal includes a capturing unit, a recognition unit for recognizing a first gesture of a user for specifying a product, in an image captured by the capturing unit, an acquisition unit for acquiring, in a case where the first gesture is recognized by the recognition unit, product information of the product specified using the image where the first gesture is recognized, an output control unit for controlling output of the product information in a manner allowing viewing by the user, and a processing unit for performing a predetermined process regarding an electronic transaction for the product.

14 Claims, 17 Drawing Sheets

(56) References Cited

U.S. PATENT DOCUMENTS

| | | | |
|---|---|---|---|
| 11,328,334 B1* | 5/2022 | Ethington | G06V 20/52 |
| 2014/0035913 A1* | 2/2014 | Higgins | G06Q 30/0641 |
| | | | 345/420 |
| 2014/0214628 A1* | 7/2014 | Argue | G06Q 30/0601 |
| | | | 705/27.1 |
| 2015/0012426 A1* | 1/2015 | Purves | G02B 27/017 |
| | | | 705/41 |
| 2015/0073907 A1* | 3/2015 | Purves | G06Q 20/32 |
| | | | 705/14.58 |
| 2015/0193005 A1* | 7/2015 | Di Censo | G10L 17/22 |
| | | | 345/156 |
| 2015/0356774 A1* | 12/2015 | Gal | G06T 19/20 |
| | | | 345/633 |
| 2016/0070439 A1* | 3/2016 | Bostick | G06F 3/0304 |
| | | | 715/728 |
| 2016/0189268 A1* | 6/2016 | Gandhi | G02B 27/017 |
| | | | 705/26.61 |
| 2016/0320622 A1* | 11/2016 | Yoshida | G06F 3/14 |
| 2017/0039613 A1* | 2/2017 | Kaehler | G02B 27/0172 |
| 2017/0116657 A1* | 4/2017 | Oh | G06F 3/013 |
| 2017/0124552 A1* | 5/2017 | Lee | G06Q 20/208 |
| 2017/0237899 A1* | 8/2017 | Wexler | H04W 4/02 |
| | | | 348/207.11 |
| 2017/0255838 A1* | 9/2017 | Norieda | G06K 9/4671 |
| 2018/0136465 A1* | 5/2018 | Chi | G06F 3/0416 |
| 2018/0189354 A1* | 7/2018 | Paine | G06F 3/0304 |
| 2018/0329209 A1* | 11/2018 | Nattukallingal | G06F 3/011 |
| 2019/0080171 A1* | 3/2019 | Zheng | G06T 11/60 |
| 2019/0080494 A1* | 3/2019 | Timonen | H04N 5/232939 |
| 2019/0156402 A1* | 5/2019 | Greenberger | G06V 10/751 |
| 2019/0156582 A1* | 5/2019 | Yankovich | G06Q 30/0278 |
| 2019/0354624 A1* | 11/2019 | Seshadri | G06F 16/23 |
| 2019/0370448 A1* | 12/2019 | Devine | G06Q 30/08 |
| 2020/0202417 A1* | 6/2020 | Tapley | G06Q 30/08 |
| 2021/0081981 A1* | 3/2021 | Sudhindra | G06Q 50/01 |

* cited by examiner

WEARABLE TERMINAL, INFORMATION PROCESSING TERMINAL, AND PRODUCT INFORMATION DISPLAY METHOD

BACKGROUND OF THE INVENTION

Field of the Invention

The present invention relates to a wearable terminal, an information processing terminal, a non-transitory computer readable storage medium, and a product information display method.

Description of the Related Art

Conventionally, there exists an eyewear wearable terminal which is used by being mounted on a head of a user. A part of the eyewear wearable terminal corresponding to a lens is a display for displaying information, and a user is enabled to check information that is displayed on the display while viewing actual surroundings through the display.

For example, Japanese Patent Laid-Open No. 2018-22453 discloses that a route search from a departure point to a destination point may be performed when a user wearing a wearable terminal points at the departure point and the destination point with a finger while looking at a railroad map showing station names.

However, to display information on a display of the wearable terminal described in Japanese Patent Laid-Open No. 2018-22453, a text, such as letters, has to be included in an object to be pointed at by a user. Accordingly, for example, information about a product is not obtained even if a user wearing the wearable terminal performs a gesture on a product which does not include a text or for which a text is not recognized. Accordingly, a user cannot perform various transactions using information about a product the user is looking at.

Accordingly, the present invention aims to provide a wearable terminal which enables a user to perform transactions using information about a product the user is looking at.

SUMMARY OF THE INVENTION

A wearable terminal according to an aspect of the present invention includes: a capturing unit; a recognition unit for recognizing a first gesture of a user for specifying a product, in an image captured by the capturing unit; an acquisition unit for acquiring, in a case where the first gesture is recognized by the recognition unit, product information of the product specified using the image where the first gesture is recognized; an output control unit for controlling output of the product information in a manner allowing viewing by the user; and a processing unit for performing a predetermined process regarding an electronic transaction for the product.

According to this aspect, a user may intuitively acquire product information simply by performing a gesture for specifying a product, even if a product does not include a text. Furthermore, a process regarding an electronic transaction is automatically performed using the acquired product information, and thus, a burden on the user is reduced.

According to the present invention, there may be provided a wearable terminal which is capable of performing transactions using information about a product a user is looking at.

DETAILED DESCRIPTION OF THE PREFERRED EMBODIMENTS

Figure 1:
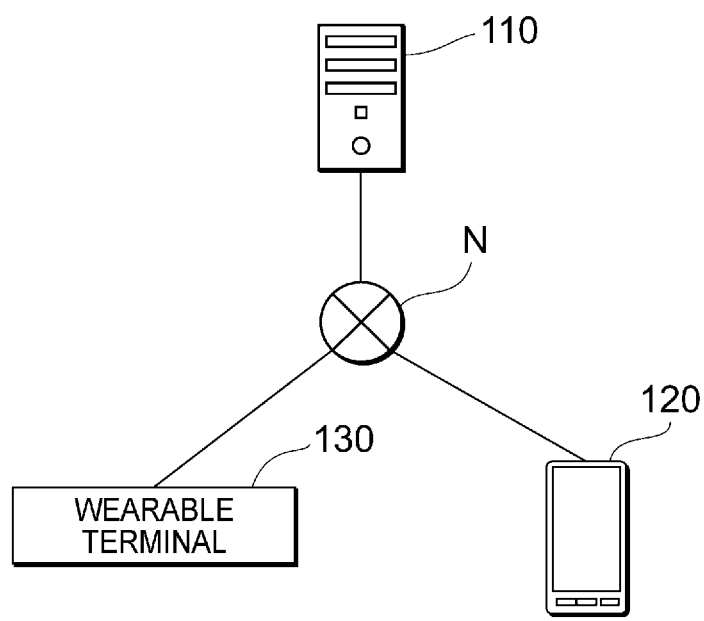
FIG. 1 is a diagram showing a communication system according to an embodiment of the present invention.

An embodiment of the present invention will be described with reference to the appended drawings. In the drawings, those denoted by a same reference sign has a same or similar configuration.

FIG. 1 is a diagram showing a communication system 1 according to the present embodiment. The communication system 1 is a system for displaying, on a wearable terminal 130 worn by a user, product information of a product specified based on a gesture performed by the user. Furthermore, the communication system 1 is capable of performing predetermined processes regarding electronic transactions for a product specified by a gesture. For example, the communication system 1 displays product information of a product indicated by a finger of a user, on a display provided at the wearable terminal 130, and then, performs a listing process of listing the product on an electronic transaction platform. The listing process includes exhibiting the product or a service in a certain event.

The product information is various pieces of information about a product. For example, the product information may include a name of a product, a price, a model number, a color, a state, a manufacturer, rating information for the product on the electronic transaction platform, or information indicating whether watch list registration, described later, is performed or not. Additionally, a product is not limited to a non-living object, and may be a living object such as a pet. Moreover, a product may be a real estate such as a building.

The communication system 1 includes a server 110, a terminal 120, and the wearable terminal 130. The server 110, the terminal 120, and the wearable terminal 130 are interconnected through a communication network N such as the Internet, wireless LAN, Bluetooth (registered trademark), or cable communication, in a manner capable of communication. The number of each of the server 110, the terminal 120, and the wearable terminal 130 provided in the communication system 1 does not have to be one, and the server 110, the terminal 120, and the wearable terminal 130 may be provided in plurality. Furthermore, the server 110 may be configured of one appliance or of a plurality of appliances, or may be a server on a cloud.

For example, the terminal 120 may be a smartphone, a tablet terminal, a mobile phone, a personal computer (PC), a personal digital assistant (PDA), a home game console, or the like.

The wearable terminal 130 is an electronic device to be worn by a user. For example, the wearable terminal 130 may be an eyewear terminal (smart glasses), a contact lens terminal (smart contact lens), a head-mounted display that uses an augmented reality (AR) technology, an artificial eye, or the like. In the present embodiment, a case where the wearable terminal 130 is an eyewear terminal (smart glasses) will be described as an example.

Figure 2:
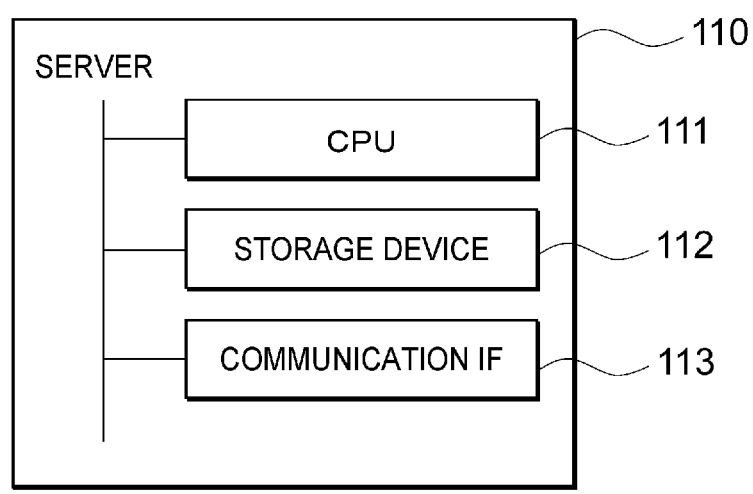
FIG. 2 is a diagram showing an example of a hardware configuration of a server.

FIG. 2 is a diagram showing an example of a hardware configuration of the server 110. The server 110 includes a central processing unit (CPU) 111, a storage device 112, and a communication interface (IF) 113. These components are interconnected in a manner capable of data exchange.

The CPU 111 is a control unit for performing control regarding execution of programs stored in the storage device 112, computation of data, and processing. The CPU 111 may receive data from the communication IF 113, and may output computational result of data to an output device or store the computational result in the storage device 112.

The storage device 112 is a device for storing various pieces of information. The storage device 112 may be a volatile storage medium allowing rewriting of data, or a non-volatile storage medium allowing only reading of data.

The communication IF 113 is a device for connecting the server 110 to the communication network N. The communication IF 113 may be provided outside the server 110. In such a case, the communication IF 113 is connected to the server 110 through an interface such as a universal serial bus (USB), for example.

Figure 3:
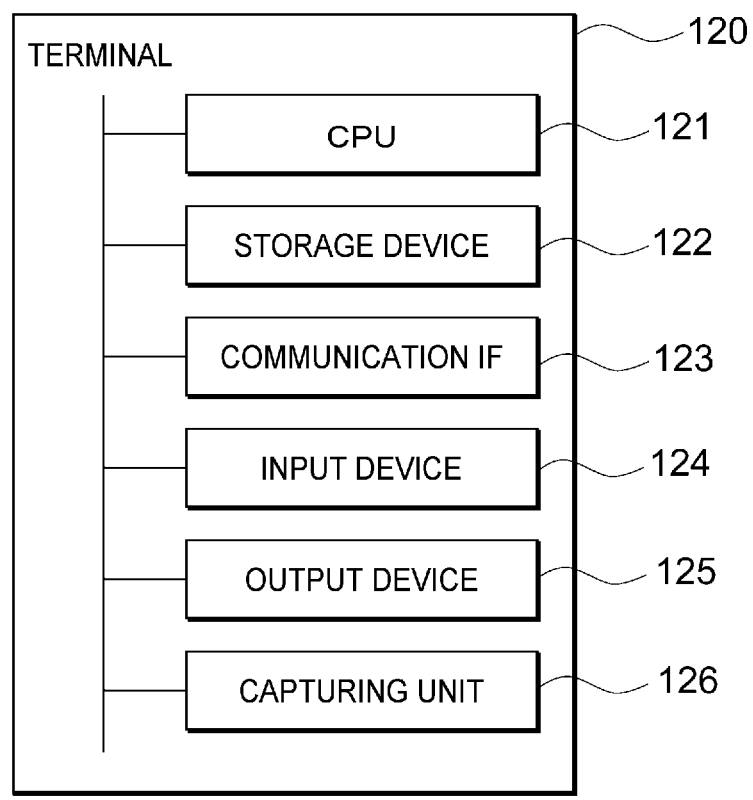
FIG. 3 is a diagram showing an example of a hardware configuration of a terminal.

FIG. 3 is a diagram showing an example of a hardware configuration of the terminal 120. The terminal 120 includes a CPU 121, a storage device 122, a communication IF 123, an input device 124, an output device 125, and a capturing unit 126. These components are interconnected in a manner capable of data exchange. The CPU 121, the storage device 122, and the communication IF 123 shown in FIG. 3 have same configurations as the CPU 111, the storage device 112, and the communication IF 113 provided in the server 110 shown in FIG. 2, and thus, a description thereof will be omitted.

The input device 124 is a device for receiving input of information from a user. For example, the input device 124 may be a touch panel, buttons, a keyboard, a mouse, or a microphone.

The output device 125 is a device for outputting information. For example, the output device 125 may be a liquid crystal display, an organic electronic luminescent (EL) display, a speaker, or a projector for projecting information on an object surface, space, or a retina.

The capturing unit 126 is a device for capturing an image (including a still image and a moving image). For example, the capturing unit 126 may include an image sensor such as a CCD image sensor, a CMOS image sensor, or a lens.

Figure 4:
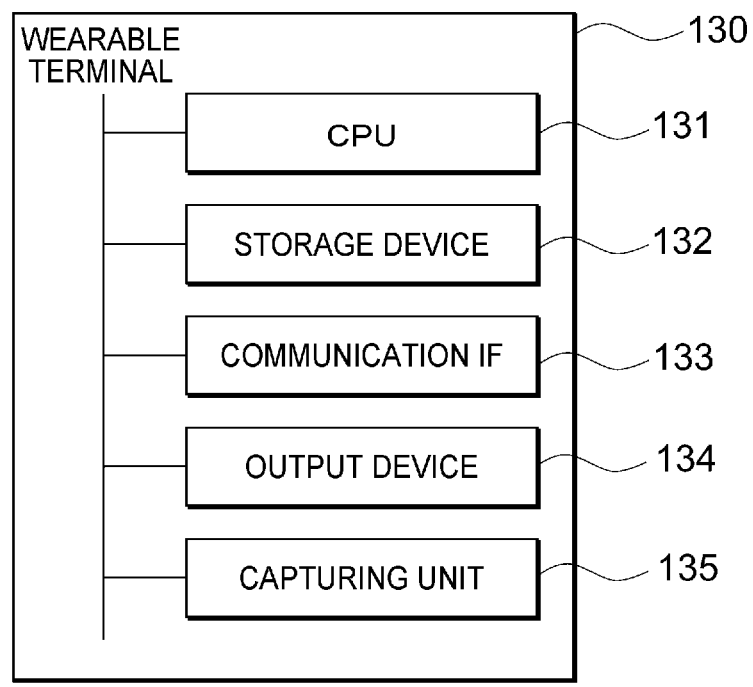
FIG. 4 is a diagram showing an example of a hardware configuration of a wearable terminal.

FIG. 4 is a diagram showing an example of a hardware configuration of the wearable terminal 130. The wearable terminal 130 includes a CPU 131, a storage device 132, a communication IF 133, an output device 134, and a capturing unit 135. These components are interconnected in a manner capable of data exchange. The CPU 131, the storage device 132, the communication IF 133, the output device 134, and the capturing unit 135 provided in the wearable terminal 130 have same configurations as the CPU 121, the storage device 122, the communication IF 123, the output device 125, and the capturing unit 126 provided in the terminal 120 shown in FIG. 3, and thus, a description thereof will be omitted.

Figure 5:
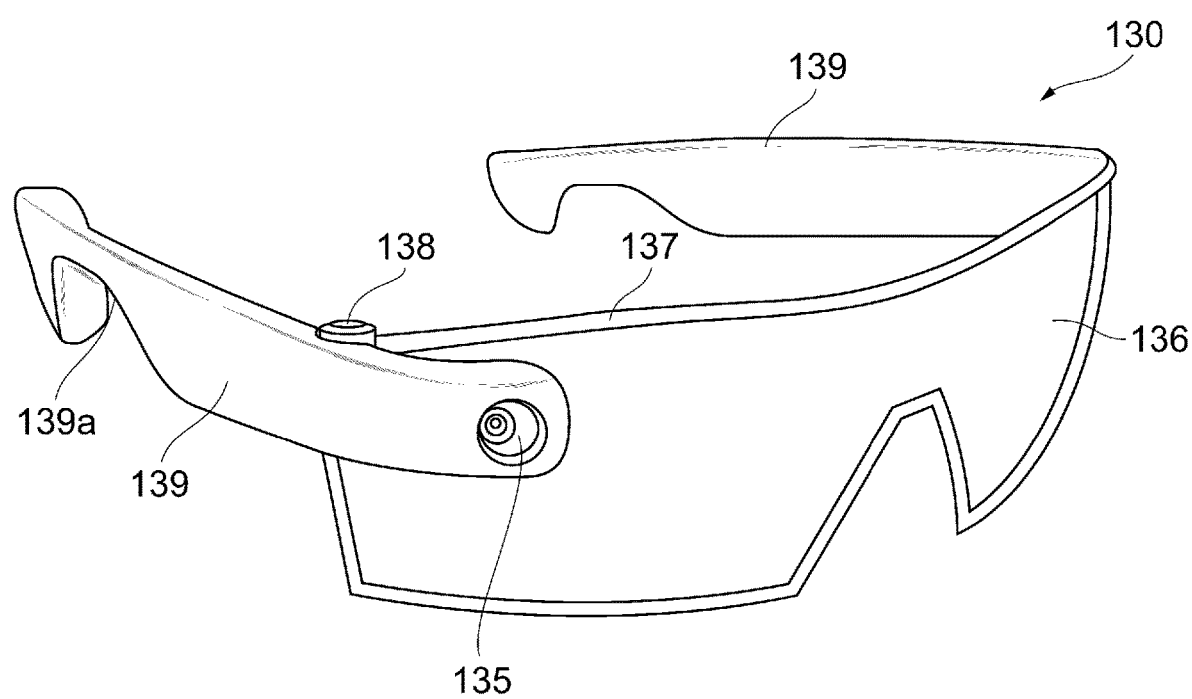
FIG. 5 is a diagram showing an example of an external appearance of the wearable terminal.

FIG. 5 is a diagram showing an example of an external appearance of the wearable terminal 130. The wearable terminal 130 includes the capturing unit 135, a display 136, a frame 137, hinge portions 138, and temples 139.

As described above, the capturing unit 135 is a device for capturing an image. The capturing unit 135 may include an image sensor, not shown, such as a CCD image sensor, a CMOS image sensor, or a lens.

The display 136 is an output device for displaying various pieces of information such as the product information, under control of an output control unit 144 described later. The display 136 may be formed of a member that transmits visible light so that a user wearing the wearable terminal 130 is able to see surroundings in a real space. For example, the display 136 may be a liquid crystal display or an organic EL display that uses a transparent substrate.

The frame 137 is provided surrounding an outer perimeter of the display 136, and protects the display 136 from impact and the like. The frame 137 may be provided along an entire outer perimeter of the display 136, or along a part of the outer perimeter. For example, the frame 137 may be formed of metal or resin.

The hinge portions 138 rotatably connect the temples 139 to the frame 137. The temples 139 are side supports extending from both sides of the frame 137, and may be formed of metal or resin, for example. The wearable terminal 130 is worn with the temples 139, which are opened by being separated from the frame 137, positioned near temples of a user.

The temple 139 includes a hook portion 139a, which is a recessed part. When the wearable terminal 130 is worn, the hook portion 139a is positioned hanging over an ear of the user, and prevents the wearable terminal 130 from falling off a head of the user.

Figure 6:
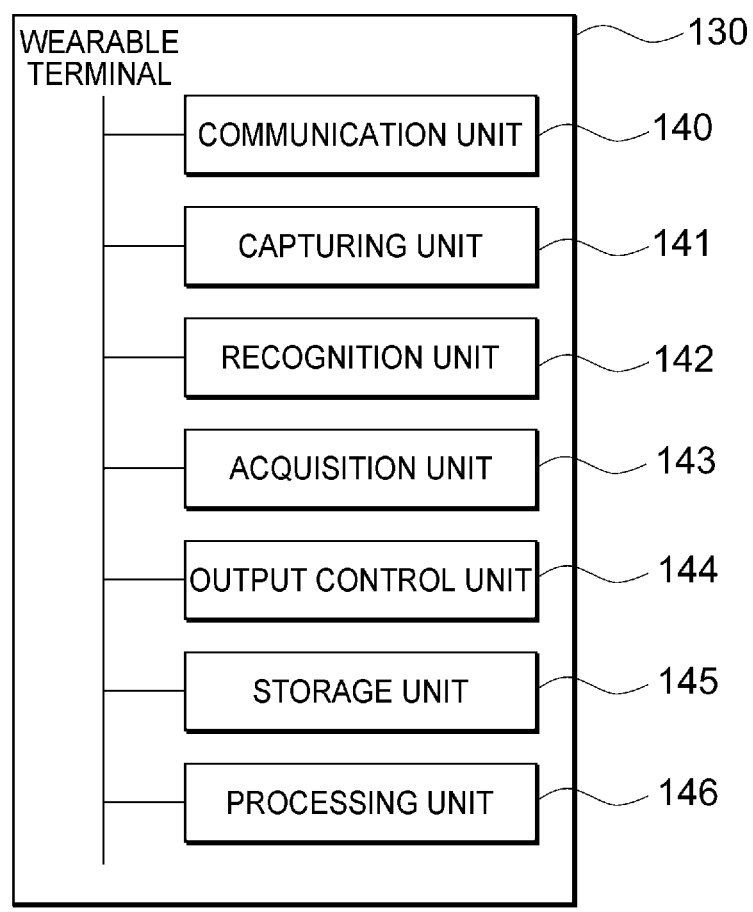
FIG. 6 is a diagram showing an example of a functional block configuration of the wearable terminal.

FIG. 6 is a diagram showing an example of a functional block configuration of the wearable terminal 130. The wearable terminal 130 includes a communication unit 140, a capturing unit 141, a recognition unit 142, an acquisition unit 143, an output control unit 144, a storage unit 145, and a processing unit 146. The communication unit 140, the capturing unit 141, the recognition unit 142, the acquisition unit 143, the output control unit 144, the storage unit 145, and the processing unit 146 may be implemented by the CPU 131 of the wearable terminal 130 executing programs stored in the storage device 132. The programs may be programs (applications) that can be downloaded from the server 110 and installed in the wearable terminal 130. The programs may be stored in a computer readable storage medium. For example, the storage medium may record the programs in a non-transitory tangible medium.

The communication unit 140 performs exchange of information with the server 110 or the terminal 120 through the communication network N. For example, the communication unit 140 may transmit an image captured by the capturing unit 141 to the server 110, and may receive the product information from the server 110.

The capturing unit 141 captures an image. The capturing unit 141 corresponds to the capturing unit 135 shown in FIG. 5. An image that is captured by the capturing unit 141 may be output to the recognition unit 142 or the storage unit 145. Furthermore, in the case where the wearable terminal 130 includes a depth sensor, the capturing unit 141 may start capturing when a predetermined motion of a user is detected by the depth sensor. Moreover, in the case where the wearable terminal 130 includes a sensor for receiving a nerve signal, for example, the capturing unit 141 may start capturing when a predetermined motion of a user (such as a finger-pointing gesture at a predetermined angle being maintained for a predetermined period of time or longer) is detected by the nerve signal sensor.

The recognition unit 142 recognizes a gesture of a user in an image captured by the capturing unit 141. The gesture here is a motion of a user, and may be a motion of pointing at a product with a finger or a motion of circling a product with a finger, for example. Furthermore, the gesture of a user does not necessarily have to be performed with a finger. For example, the gesture may be performed using another part of the user, such as an arm or a leg, or an object such as an instruction stick. Additionally, in the present embodiment, a case where the gesture is performed with a finger of a user will be described as an example.

The recognition unit 142 may recognize a gesture performed by a user, by specifying, based on characteristics of an object used for the gesture (in the present embodiment, a finger of the user), a position or a shape of the finger in an image. For example, the recognition unit 142 may recognize a gesture by specifying the finger of the user or the like in a captured image by using pattern matching. At this time, the shape, a color and the like of a finger may be stored in the storage unit 145 in advance as a specification pattern, and the recognition unit 142 may acquire the position or the shape of a finger in a captured image by specifying a pattern matching the specification pattern in the image. Additionally, the recognition unit 412 may recognize an object by using 3D space data.

Moreover, the recognition unit 142 may distinguish between and recognize a plurality of types of gestures. A predetermined process may be associated in advance with a type of gesture, and a predetermined process according to the type of gesture may be performed when the recognition unit 142 recognizes a gesture. For example, product information may be displayed on the display 136 when a specific gesture is recognized by the recognition unit 142, or the processing unit 146 described later may perform a listing process of listing a product on an electronic transaction platform with recognition of another gesture by the recognition unit 142 as a trigger.

In the case where a first gesture is recognized by the recognition unit 142, the acquisition unit 143 performs a process of acquiring product information of a product. The first gesture here is a motion of a user for specifying a product, and in the present embodiment, the first gesture is a motion of a user pointing at a product, as shown in FIG. 9B.

For example, when the first gesture is recognized by the recognition unit 142, the acquisition unit 143 transmits the captured image and position information of the finger in the image to the server 110 through the communication unit 140. A specification unit 116 of the server 110 specifies the product the user is pointing at, based on the image and the position information of the finger. Then, an acquisition unit 117 of the server 110 acquires the product information of the specified product from a storage unit 118. The acquired product information is transmitted to the wearable terminal 130 from a communication unit 115 of the server 110. Alternatively, the communication unit 140 may transmit the image where the first gesture is recognized to the server 110, and the specification unit 116 of the server 110 may specify the position of the finger in the received image.

Additionally, the acquisition unit 143 may acquire the product information through other than the server 110. For example, it is assumed that characteristics of a product, such as a shape or a color of the product, and the product information are stored in the storage unit 145. In this case, the acquisition unit 143 specifies a product in an image based on the characteristics of the product. Then, the acquisition unit 143 may acquire product information corresponding to the specified product, from pieces of product information stored in the storage unit 145. A specification process of a product by the acquisition unit 143 may be a same process as a specification process that is performed by the specification unit 116 of the server 110 described later with reference to FIG. 7.

The output control unit 144 controls the output device 134, and outputs various pieces of information. In the present embodiment, the output control unit 144 performs control of displaying product information acquired by the acquisition unit 143 on the display 136. The output control unit 144 may perform control of displaying the product information only in a case where the finger of a user used for a gesture is included in an image captured by the capturing unit 141 or in a case where the finger is positioned in a predetermined region of the image (such as a substantially center region of the image), and the output control unit 144 may perform control of hiding the product information in a case where a finger is not included in the image or is not positioned in the predetermined region. This enables a user to easily switch between display and non-display of the product information.

The storage unit 145 stores various pieces of information. For example, the storage unit 145 may store characteristics of a finger of a user which is used for a gesture. Furthermore, the storage unit 145 may store the product information, user information, and the like. The user information here is information about a user who uses the communication system 1, and may include a user identifier, a name, a gender or an address of the user, information about electronic transactions performed by the user in the past, and the like.

The processing unit 146 performs processes regarding electronic transactions for a product in an image (such as a product specified by a gesture). For example, the processing unit 146 may perform a listing process of listing a product indicated by the user on an electronic transaction platform. At this time, the processing unit 146 may perform the listing process by using product information or the like acquired by the acquisition unit 143. Specifically, a product description used at the time of listing a product on an electronic transaction platform may be created based on the product information.

Furthermore, the processing unit 146 may use an image of a product captured by the capturing unit 141, as an image used at the time of listing the product on the electronic transaction platform. At this time, the processing unit 146 may pick an image suitable for listing on the electronic transaction platform (such as an image showing the entire product) from a plurality of images captured by the capturing unit 141, and use the image in the listing process. Moreover, the processing unit 146 may process an image (by trimming or by changing brightness, for example), and, then, use the image in the listing process. Furthermore, the processing unit 146 may perform the listing process with recognition of a second gesture of the user by the recognition unit 142 as a trigger. Details of the second gesture and the listing process that uses the second gesture as a trigger will be described later with reference to FIG. 10 and FIGS. 11A to 11D.

The processing unit 146 may perform a purchasing process of purchasing a product, indicated by the user, on the electronic transaction platform. At this time, the processing unit 146 may perform the purchasing process based on the product information acquired by the acquisition unit 143 or the user information stored in the storage unit 145. For example, in the purchasing process, the processing unit 146 may determine a delivery destination of the product based on address information of the user stored in the storage unit 145. Furthermore, the processing unit 146 may perform the purchasing process with recognition of a third gesture of the user by the recognition unit 142 as a trigger. Details of the third gesture and the purchasing process that uses the third gesture as a trigger will be described later with reference to FIG. 12 and FIGS. 13A to 13D.

Furthermore, in the case where a fourth gesture is recognized by the recognition unit 142, the processing unit 146 may perform a process of registering the product in a predetermined list. The predetermined list may be a list collecting products selected by the user, for example. In the present embodiment, the predetermined list will be referred to as a watch list. For example, by registering, in the watch list, a product that a user is considering purchasing, the user may easily call up the product information from the list when wishing to view information about the product again. Additionally, products that can be registered in the list are not limited to products, purchase of which is being considered, and a user may register any product in the list. The watch list may be stored in the storage unit 145.

Figure 7:
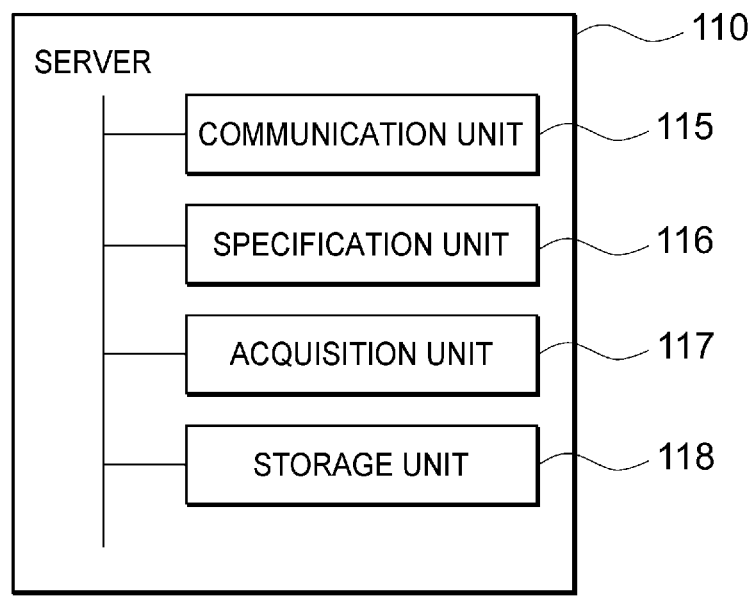
FIG. 7 is a diagram showing an example of a functional block configuration of the server.

FIG. 7 is a diagram showing an example of a functional block configuration of the server 110. The server 110 includes the communication unit 115, the specification unit 116, the acquisition unit 117, and the storage unit 118. The communication unit 115, the specification unit 116, the acquisition unit 117, and the storage unit 118 may be implemented by the CPU 111 of the server 110 performing the programs stored in the storage device 112.

The communication unit 115 exchanges information with the terminal 120 or the wearable terminal 130 through the communication network N. For example, the communication unit 115 may receive an image captured by the wearable terminal 130. Furthermore, the communication unit 115 may transmit the product information to the wearable terminal 130.

The specification unit 116 specifies a product in an image received from the wearable terminal 130. For example, the specification unit 116 may specify a product in a captured image by using pattern matching. A shape, a color and the like of a product may be stored in the storage unit 118 in advance as a specification pattern, and the specification unit 116 may specify a product included in a captured image by specifying, in the image, a pattern that coincides with the specification pattern.

Additionally, a product does not have to be specified by the method described above. For example, a learned model obtained by learning images of products with different sizes or at different orientations as teaching data may be prepared, and the specification unit 116 may specify a product in an input image by using the learned model. The learned model may be held by the server 110, or by the wearable terminal 130 or the terminal 120.

Additionally, in the case where a plurality of products are present in an image, the specification unit 116 may specify a product which is closest to an end portion of an object used for a gesture (in the present embodiment, a tip of a finger) as the product indicated by the user.

The acquisition unit 117 acquires the product information about the product specified by the specification unit 116, from pieces of product information stored in the storage unit 118.

The storage unit 118 stores various pieces of information. For example, the storage unit 118 may store the product information, the user information, and the like. Furthermore, the storage unit 118 may store characteristics of a product used for specification of the product by the specification unit 116, and images received from the wearable terminal 130.

Figure 8:
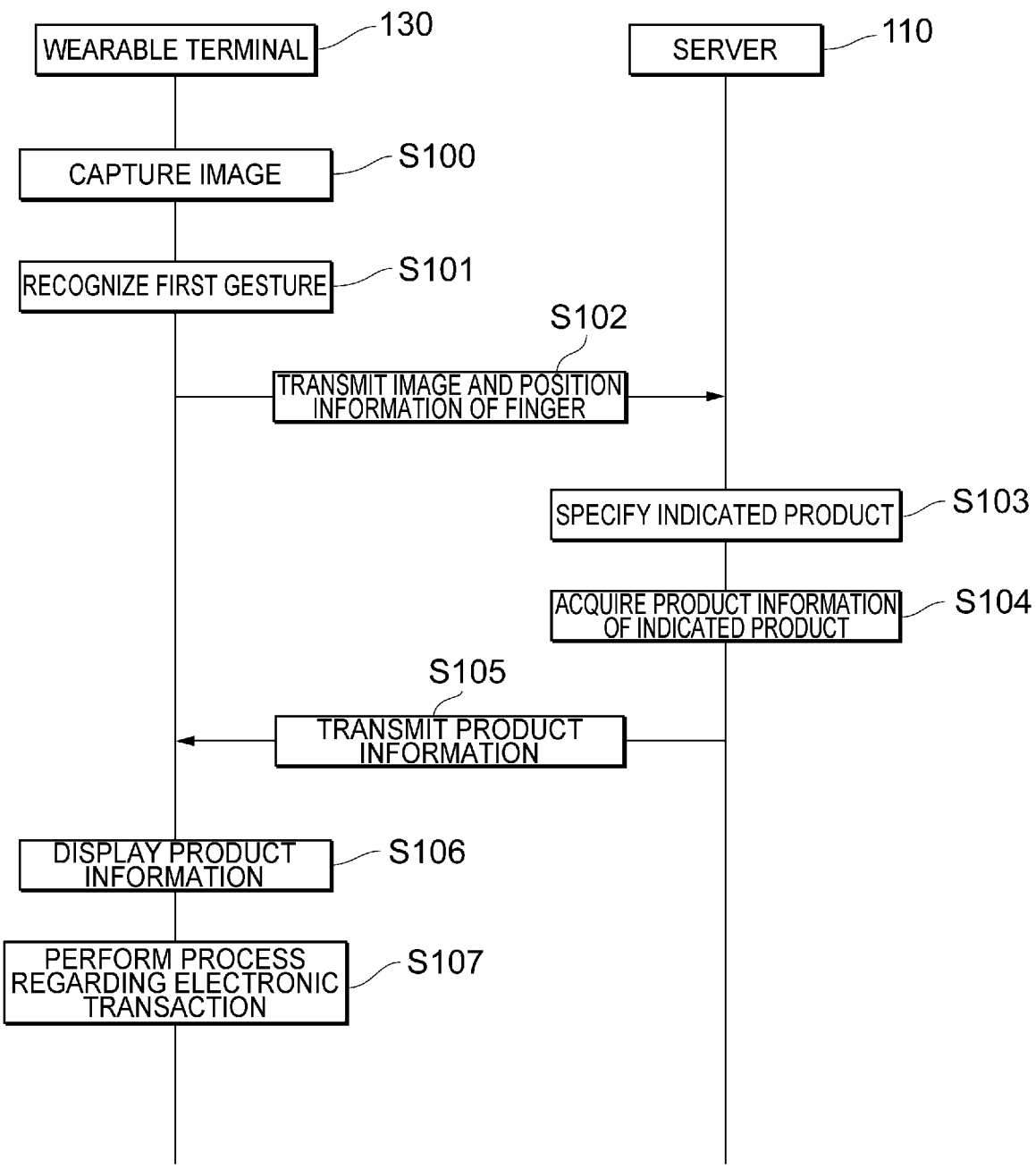
FIG. 8 is a sequence diagram showing an example of a process by the communication system.

FIG. 8 is a sequence diagram showing an example of a process by the communication system 1. A process of displaying, on the display 136 of the wearable terminal 130, product information of a product pointed at by a user will be described with reference to FIG. 8.

First, the capturing unit 141 of the wearable terminal 130 performs capturing (step S100).

Then, the recognition unit 142 of the wearable terminal 130 recognizes the first gesture of the user in the image captured by the capturing unit 141 (step S101). At this time, the recognition unit 142 may specify the position or the shape of a finger in the image based on the characteristics or the like of a finger of the user stored in the storage unit 145, and may recognize the first gesture.

Then, the communication unit 140 of the wearable terminal 130 transmits the image captured by the capturing unit 141, and the position information of the finger acquired by the recognition unit 142 to the server 110 (step S102).

When the image and the position information of the finger are received from the wearable terminal 130 by the communication unit 115 of the server 110, the specification unit 116 of the server 110 specifies the product (step S103). At this time, the specification unit 116 may specify the product in the image based on the characteristics of products stored in the storage unit 118. Furthermore, in the case where a plurality of products are present in the image, the specification unit 116 may specify, as the product indicated by the user, the product which is closest to the finger, based on the position information of the finger.

Next, the acquisition unit 117 of the server 110 acquires the product information of the product specified by the specification unit 116, from the storage unit 118 (step S104).

Then, the communication unit 115 of the server 110 transmits the product information acquired by the acquisition unit 117 to the wearable terminal 130 (step S105).

When the communication unit 140 of the wearable terminal 130 receives the product information from the server 110, the output control unit 144 of the wearable terminal 130 displays the product information on the display 136 (step S106). An output mode of the product information is described below with reference to FIGS. 9A and 9B.

Figure 9A:
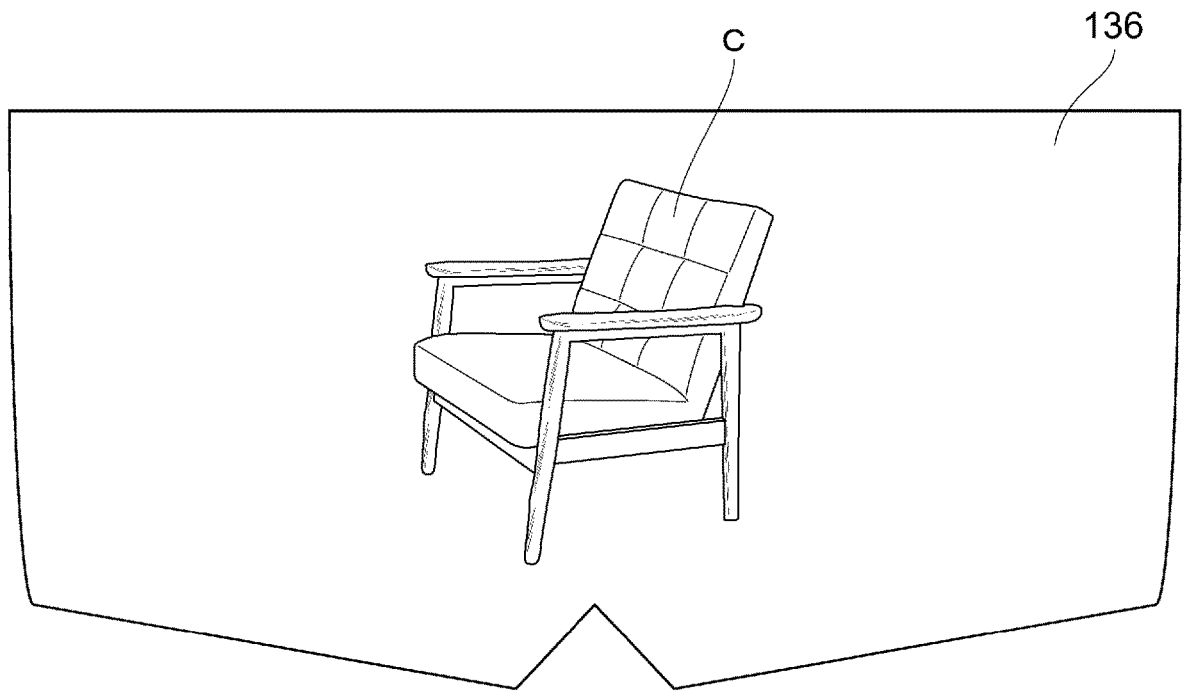
FIGS. 9A and 9B are diagrams showing an example of output of product information by an output control unit of the wearable terminal.
Figure 9B:
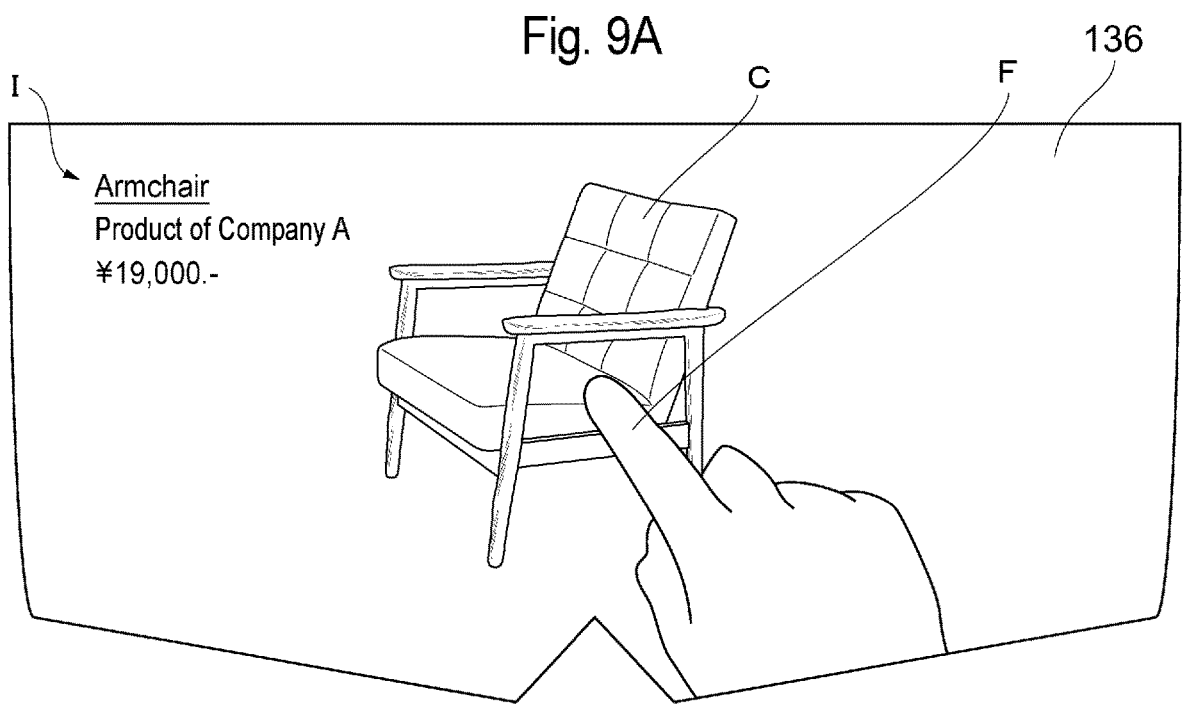

FIGS. 9A and 9B are diagrams showing the product information being displayed on the display 136 of the wearable terminal 130 as a text I. FIGS. 9A and 9B show a video that is viewed by a user wearing the wearable terminal 130. FIG. 9A is a diagram of a state where the text I is not displayed on the display 136, and FIG. 9B is a diagram of a state where the text I is displayed on the display 136.

As described above, the display 136 is formed of a member that transmits visible light. Accordingly, as shown in FIG. 9A, the user may look at a chair C through the display 136. When the user performs the first gesture (in the present embodiment, a motion of pointing at the chair C) in this state, product information of the chair C is displayed on the display 136 as the text I, as shown in FIG. 9B. In the present embodiment, a name, a manufacturer, and a product price of the product are displayed by sentences, "Armchair", "Product of Company A", and "¥19,000.-", respectively. The product price may be an average price, a highest price, or a lowest price of the product on the electronic transaction platform. Additionally, the product information that is displayed on the display 136 as the text I is not limited to the above. For example, information such as a title (name), a model number, a color, a size, or a state of the product may be displayed. Furthermore, the text I may be displayed on the display 136 based on a product description of the product that is listed by a user who is highly rated on the electronic transaction platform. For example, in the case where the product description of the product that is listed by a user who is highly rate is described in a simple sentence, the text I may be displayed in a simple sentence on the display 136.

Furthermore, the output control unit 144 may display the text I at a position overlapping the chair C, for example, without being restricted to the position shown in FIG. 9B. Moreover, the output control unit 144 does not have to fix and display the text I at a specific position, and, for example, the text I may be displayed while being moved to follow the chair C, when a viewing direction of the user changes. Moreover, the output control unit 144 may place a filter on at least a part of the display 136, and may display the text I in a manner overlapping the filter. For example, the output control unit 144 may place a white filter on a part of the display 136, and may display the text I in black letters in a manner overlapping the filter. By adjusting a contrast between letters and a background, a user is enabled to easily look at the text I.

In the case where the wearable terminal 130 includes a projector, the output control unit 144 may project the text I on an object surface or in a space by using the projector. Moreover, in the case where the wearable terminal 130 includes a speaker, the output control unit 144 may output audio using the speaker, after converting the product information into audio information.

Referring back to FIG. 8, the description will be further given. After the product information is displayed as the text I on the display 136 by the output control unit 144 (step S106), the processing unit 146 performs a process regarding an electronic transaction for the product (step S107). For example, the processing unit 146 may perform the listing process of listing the product on the electronic transaction platform, or the purchasing process of purchasing the product.

With the wearable terminal 130 according to the present embodiment, a user may intuitively acquire the product information simply by performing the first gesture of specifying a product, even in a case of a product not including a text, for example. Furthermore, a process regarding an electronic transaction is automatically performed by the processing unit 146 using the product information.

At least a part of various processes, described above with reference to FIG. 8, performed by the server 110 may be performed by the wearable terminal 130. For example, the wearable terminal 130 may specify a product included in an image without transmitting the image to the server 110, and may display product information on the display 136 based on the product information stored in the storage unit 145.

Furthermore, the processes, described above, performed by the wearable terminal 130 may be performed by the terminal 120. For example, the terminal 120 may specify a product from an image captured by the capturing unit 126 that is mounted, and may display product information of the product on the output device 125 such as a display.

Figure 10:
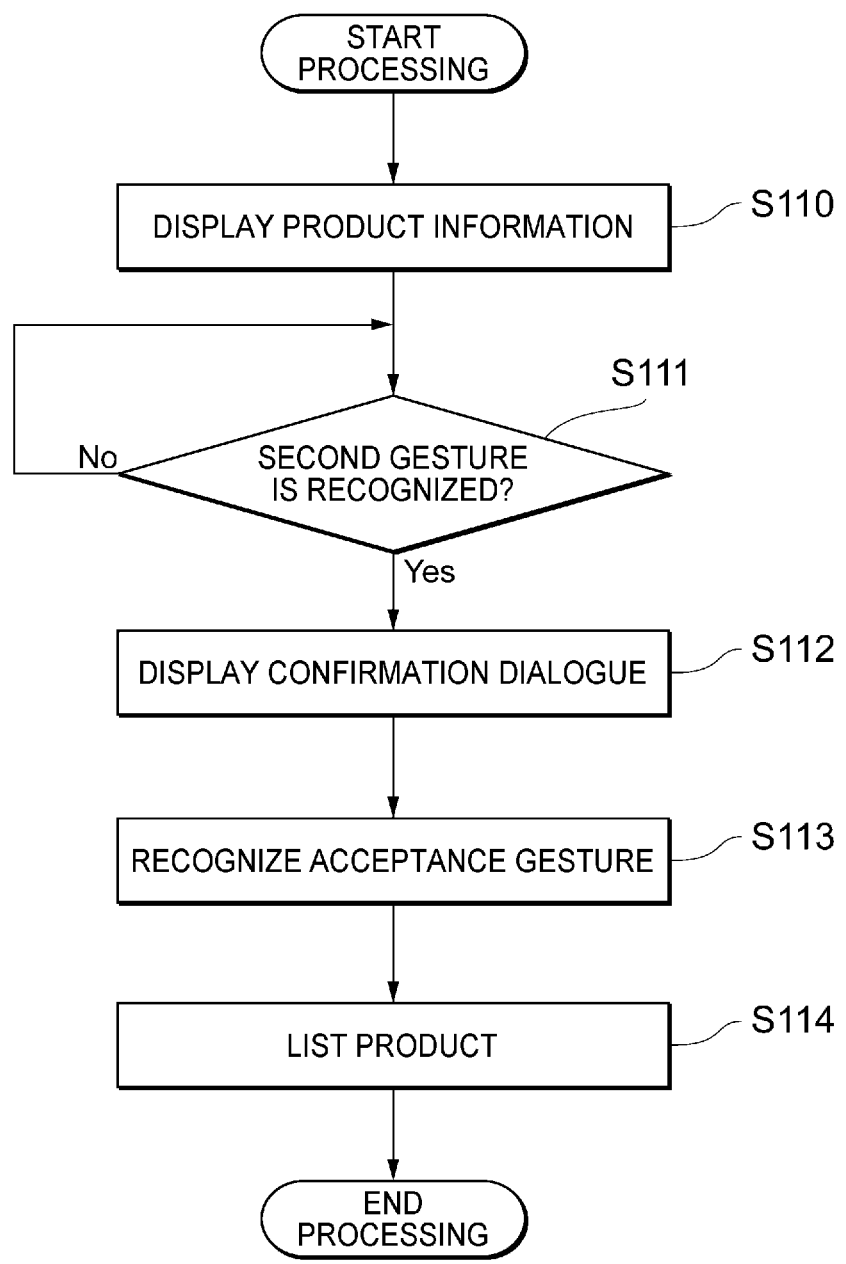
FIG. 10 is a flowchart showing an example of a listing process of a product by the wearable terminal.

Next, the listing process of a product performed by the wearable terminal 130 will be described with reference to FIG. 10 and FIGS. 11A to 11D. FIG. 10 is a flowchart showing an example of the listing process of a product by the wearable terminal 130. FIGS. 11A to 11D are diagrams showing an example of the second gesture of a user and an output by the output control unit 144. In the present embodiment, a case where the listing process of a product is performed with the second gesture of a user as a trigger will be described as an example.

Figure 11A:
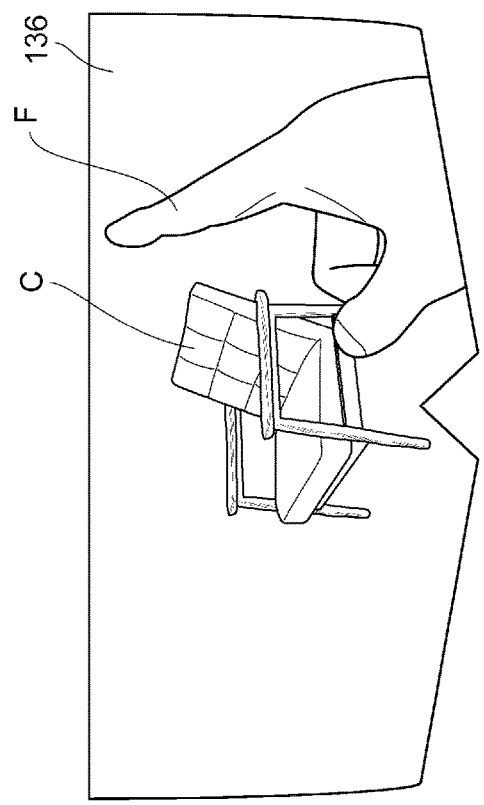
FIGS. 11A to 11D are diagrams showing an example of output by the output control unit performed at a time of the listing process of a product.

First, as shown in FIG. 11A, when a user performs the first gesture (a gesture of pointing at the chair C), the product information of the chair C is displayed on the display 136 as the text I (step S110). Additionally, processes up to display of the product information are the same as the processes from step S100 to step S106 described with reference to FIG. 8, and a description thereof will be omitted. In the present embodiment, the product name, the manufacturer, and the product price of the chair C are displayed, as shown in FIG. 11A.

Figure 11B:
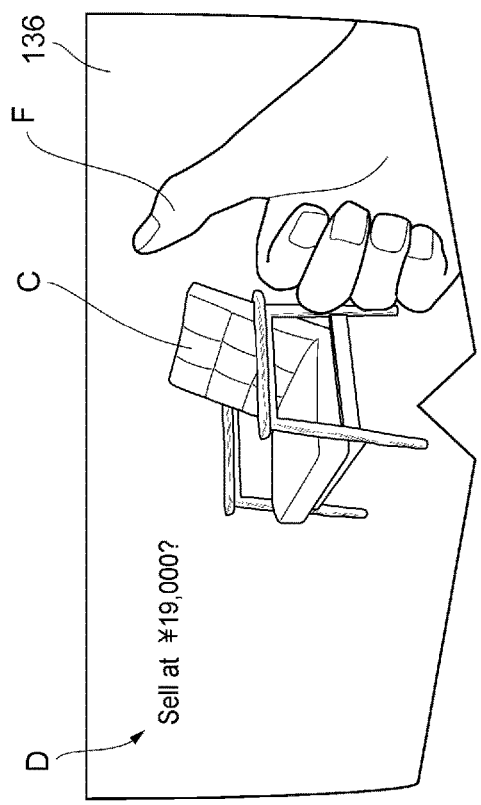
Figure 11C:
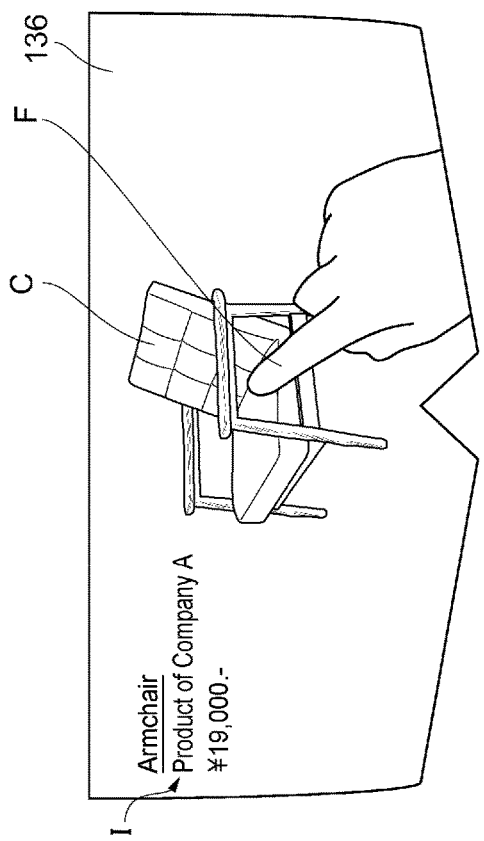

Next, the recognition unit 142 determines whether the second gesture of the user is recognized in the image captured by the capturing unit 141 or not (step S111). The second gesture here is a gesture which acts as a trigger for starting the listing process by the processing unit 146. As shown in FIGS. 11B and 11C, in the present embodiment, the second gesture is a gesture of clicking after sliding and separating the finger indicating the chair C from the chair C. Additionally, details of the second gesture are not limited thereto, and may be freely set by the user.

Figure 11D:
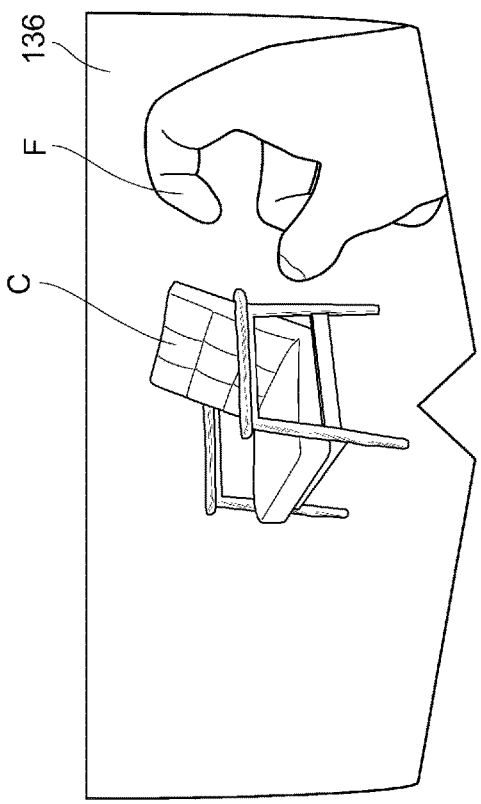

In the case where the second gesture of the user is recognized by the recognition unit 142 (step S111: Yes), the output control unit 144 displays a confirmation dialogue D on the display 136 (step S112). In the case where the second gesture of the user is not recognized by the recognition unit 142 (step S111: No), the recognition unit 142 performs the determination process again (step S111). The confirmation dialogue D here is a display for urging the user to confirm whether or not to perform a process by the processing unit 146. As shown in FIG. 11D, in the present embodiment, a sentence including a product price, "Sell at ¥19,000?", is displayed on the display 136. The product price here is a price that is set for a product (in the present embodiment, the chair C) at the time of listing the product on the electronic transaction platform.

The product price may be the same or different from the product price included in the text I. Furthermore, the processing unit 146 may determine a product state of the chair C (such as damages or a degree of stains) based on the captured image, and may calculate the product price based on the determination result. At this time, calculation of the product price by the processing unit 146 may be performed more appropriately, the greater the number of product images with different capturing angles. Accordingly, the user desirably looks at the product from various angles, and the capturing unit 141 desirably captures images of the product from many angles. Additionally, the product price may be freely changed by the user.

Then, the recognition unit 142 recognizes an acceptance gesture of the user (step S113). The acceptance gesture here is a reply of the user to the confirmation dialogue D, and is a gesture for accepting processing by the processing unit 146. As shown in FIG. 11D, in the present embodiment, the acceptance gesture is a gesture of turning up a thumb. Additionally, details of the acceptance gesture are not limited thereto, and may be freely set by the user.

When the acceptance gesture is recognized by the recognition unit 142, the processing unit 146 lists the product on the electronic transaction platform (step S114). At this time, the processing unit 146 may perform listing based on the product information or the user information stored in the storage unit 145. Processing by the wearable terminal 130 is then ended. Additionally, the display process of the confirmation dialogue D (step S112) and the recognition process of the acceptance gesture (step S113) may be omitted, and the processing unit 146 may list the product without these processes being performed.

Figure 12:
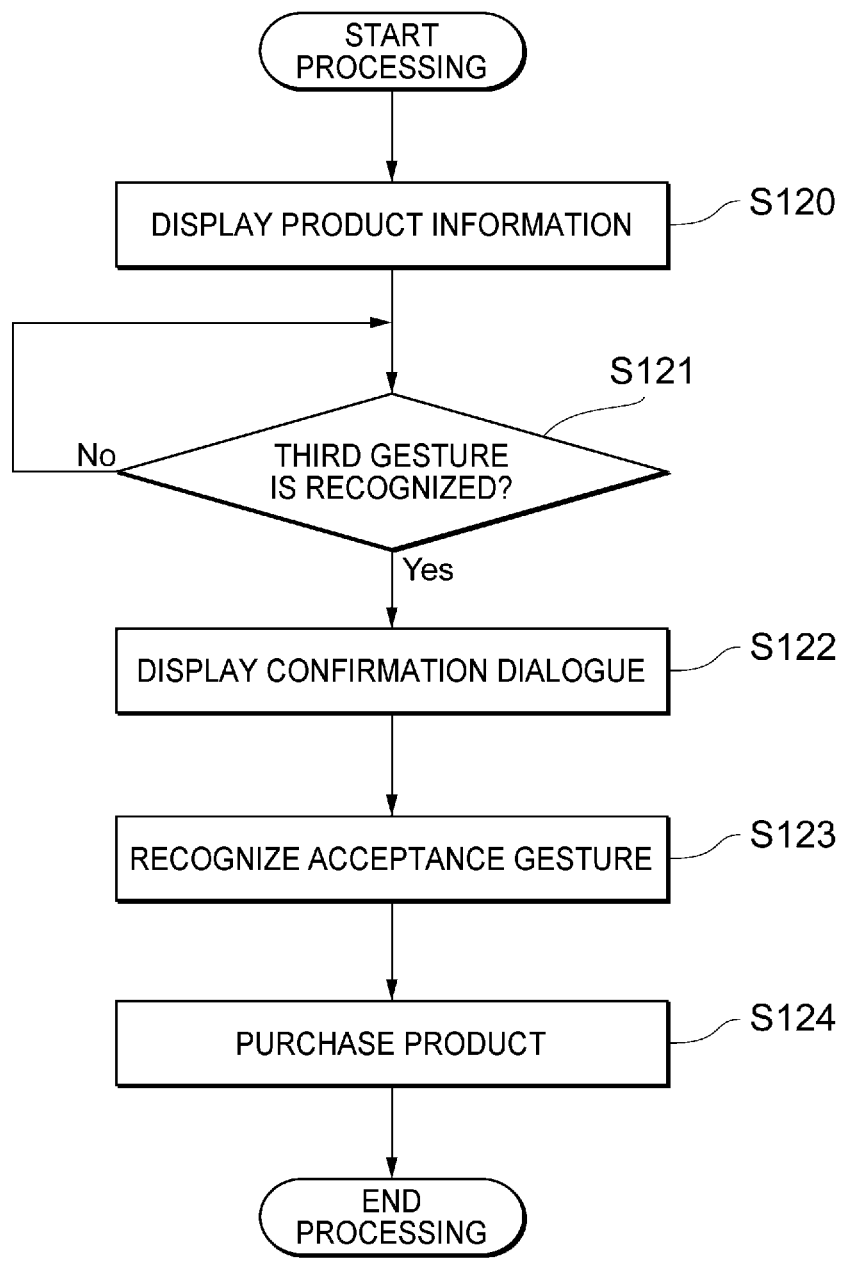
FIG. 12 is a flowchart showing an example of a purchasing process of a product by the wearable terminal.

Next, the purchasing process of a product performed by the wearable terminal 130 will be described with reference to FIG. 12 and FIGS. 13A to 13D. FIG. 12 is a flowchart showing an example of the purchasing process of a product by the wearable terminal 130. FIGS. 13A to 13D are diagrams showing an example of the third gesture of a user and an output by the output control unit 144. In the present embodiment, a case where the purchasing process of a product is performed with the third gesture of a user as a trigger will be described as an example.

Figure 13A:
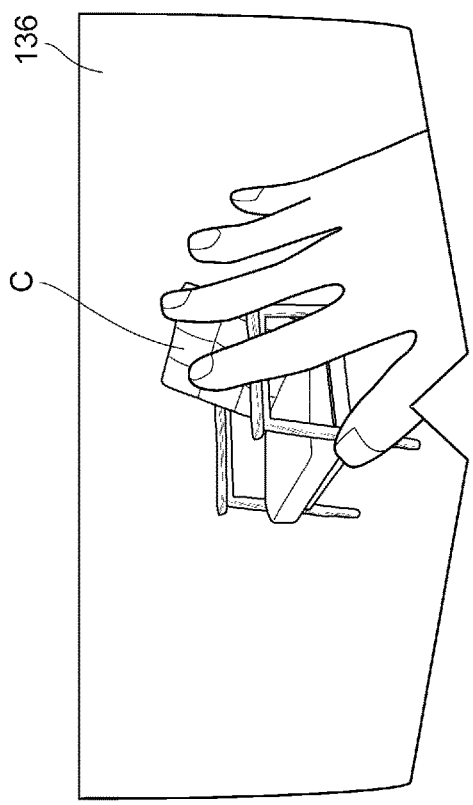
FIGS. 13A to 13D are diagrams showing an example of output by the output control unit performed at a time of the purchasing process of a product.

First, when the first gesture (the gesture of pointing at the chair C) is performed by the user, as shown in FIG. 13A, the product information of the chair C is displayed on the display 136 as the text I (step S120). Additionally, processes up to display of the product information are the same as the processes from step S100 to step S106 described with reference to FIG. 8, and a description thereof will be omitted. In the present embodiment, the product name, the manufacturer, and the product price of the chair C are displayed, as shown in FIG. 13A.

Figure 13B:
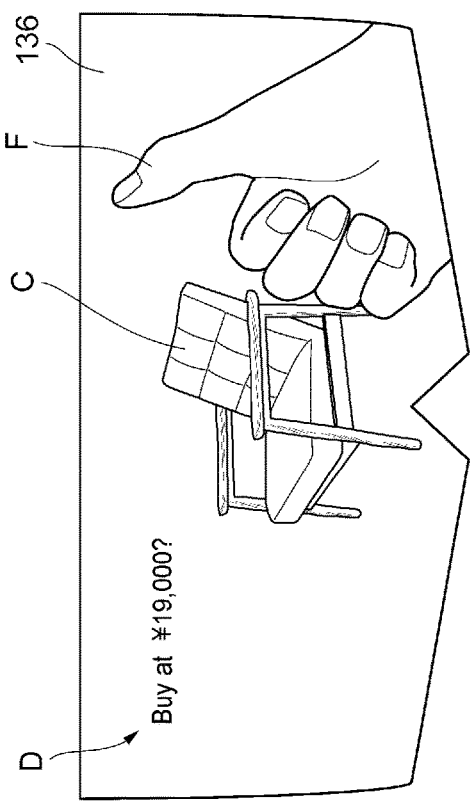
Figure 13C:
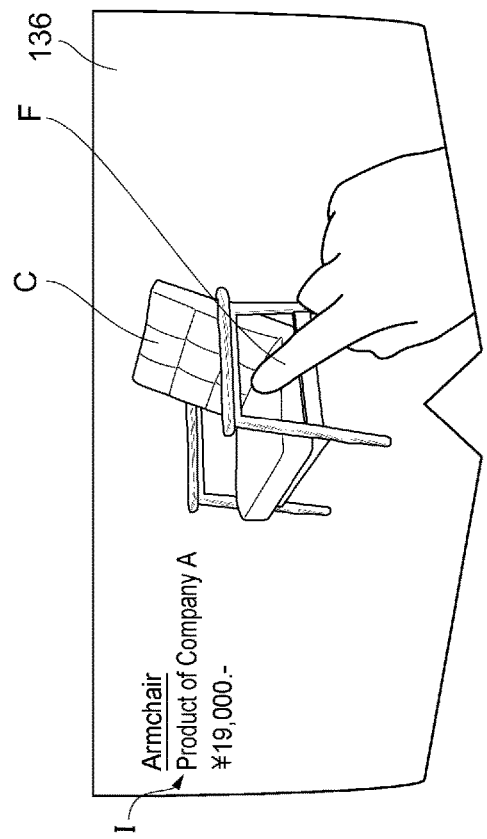

Next, the recognition unit 142 determines whether the third gesture of the user is recognized or not (step S121). The third gesture here is a gesture which acts as a trigger for starting the purchasing process by the processing unit 146. As shown in FIGS. 13B and 13C, in the present embodiment, the third gesture is a gesture of opening a hand and then grasping the chair C with the hand. Additionally, details of the third gesture are not limited thereto, and may be freely set by the user.

Figure 13D:
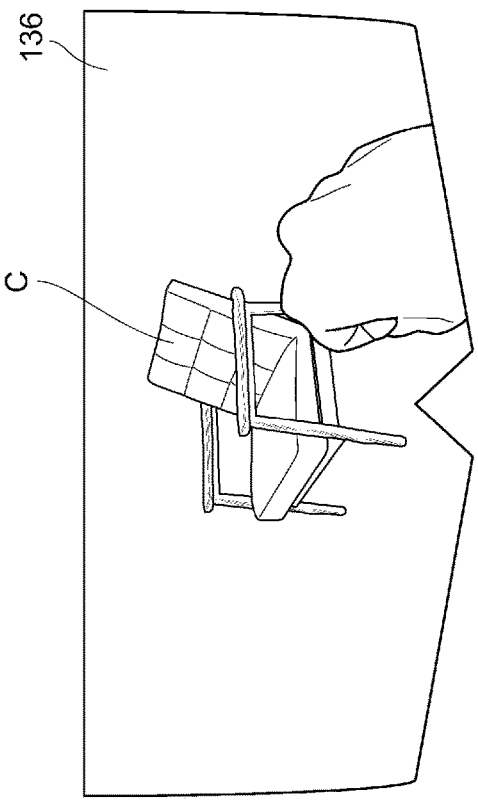

When the third gesture of the user is recognized by the recognition unit 142 (step S121: Yes), the output control unit 144 displays the confirmation dialogue D on the display 136 (step S122). In the case where the third gesture of the user is not recognized by the recognition unit 142 (step S121: No), the recognition unit 142 performs the determination process again (step S121). As shown in FIG. 13D, in the present embodiment, a sentence including a purchase price, "Buy at ¥19,000?", is displayed on the display 136 as the confirmation dialogue. The purchase price here a price that is paid in exchange to purchase a product (in the present embodiment, the chair C). The purchase price may be the price of the chair C on the electronic transaction platform, for example.

Then, the recognition unit 142 recognizes the acceptance gesture of the user (step S123). As shown in FIG. 13D, in the present embodiment, the acceptance gesture is a gesture of turning up a thumb. Additionally, details of the acceptance gesture are not limited thereto, and may be freely set by the user.

When the acceptance gesture is recognized by the recognition unit 142, the processing unit 146 purchases the product on the electronic transaction platform (step S124). At this time, the processing unit 146 may perform the purchasing process of the product based on the user information stored in the storage unit 145 or the like. For example, the processing unit 146 may set a delivery destination of the product based on the address information of the user. Processing by the wearable terminal 130 is then ended. Additionally, the display process of the confirmation dialogue D (step S122) and the recognition process of the acceptance gesture (step S123) may be omitted, and the processing unit 146 may perform purchase of the product without these processes being performed.

With the wearable terminal 130 according to the present embodiment, not only is the product information displayed, but processes regarding electronic transactions for the product (such as the listing process and the purchasing process) are automatically performed. Accordingly, a burden on the user may be reduced with respect to processes regarding electronic transactions.

Figure 14:
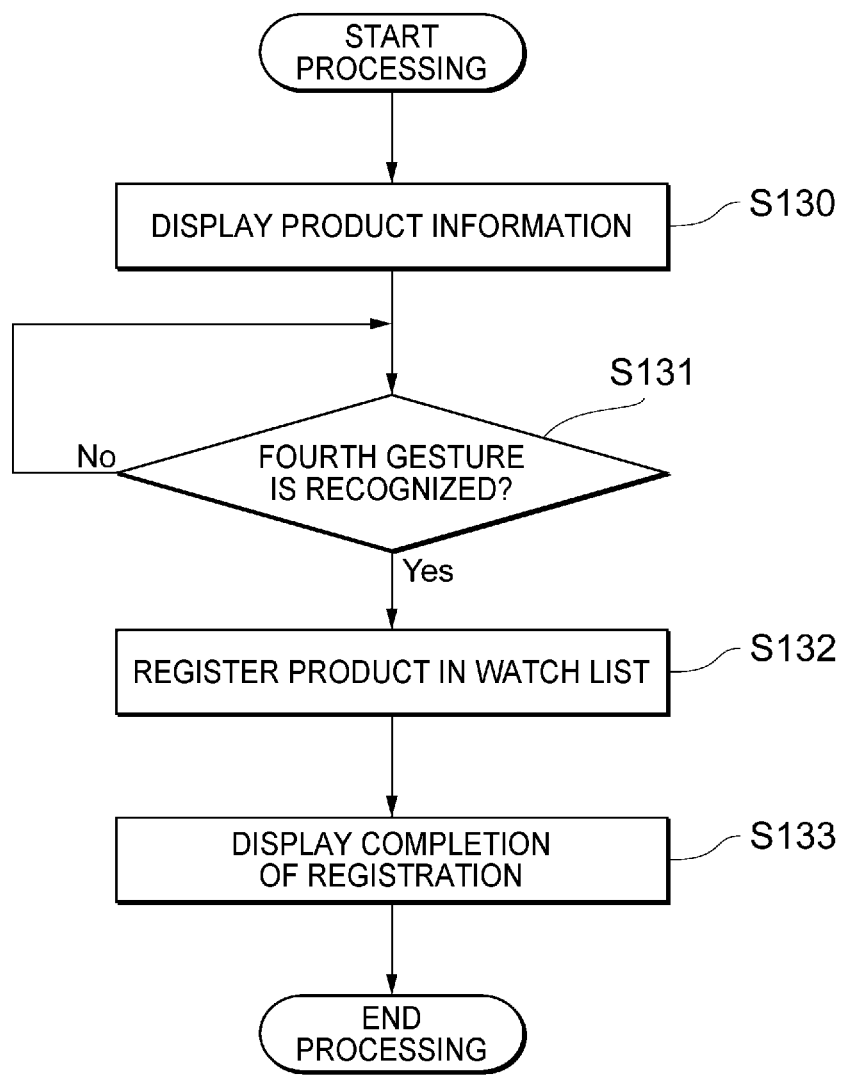
FIG. 14 is a flowchart showing an example of a registration process of a product in a watch list by the wearable terminal.
Figure 15A:
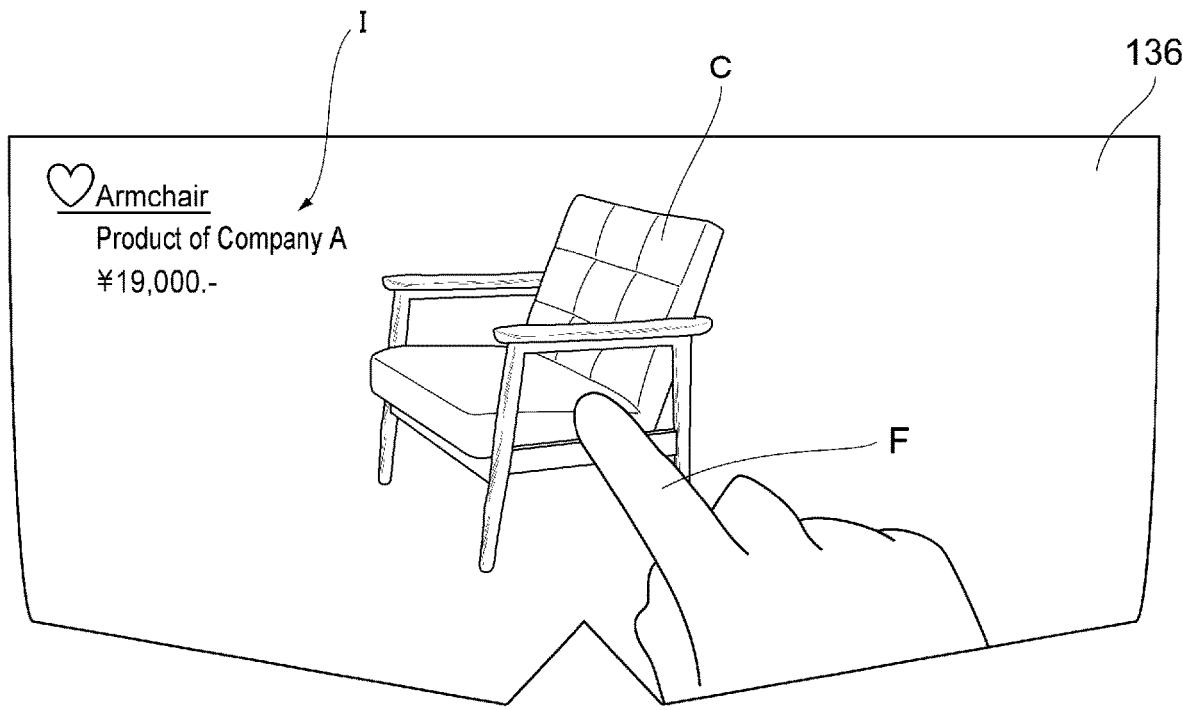
FIGS. 15A and 15B are diagrams showing an example of output by the output control unit performed at a time of the registration process in a watch list.
Figure 15B:
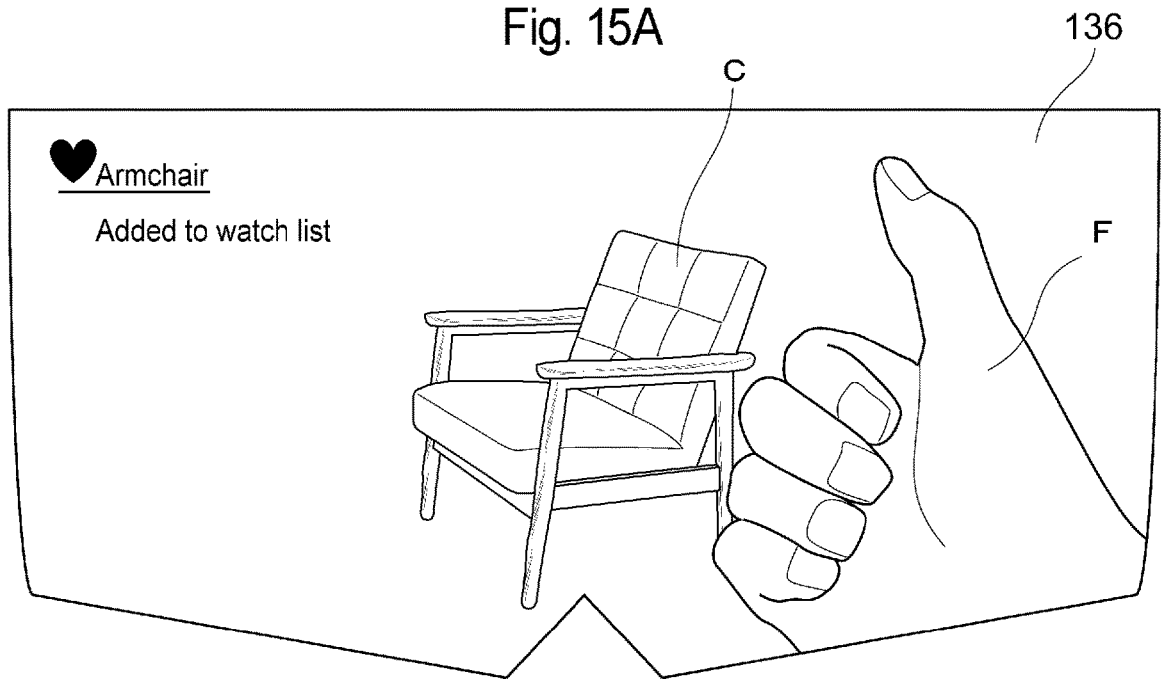

Next, a registration process of a product in a watch list performed by the wearable terminal 130 will be described with reference to FIG. 14 and FIGS. 15A and 15B. FIG. 14 is a flowchart showing an example of the registration process of a product in a watch list by the wearable terminal 130. FIGS. 15A and 15B are diagrams showing an example of the fourth gesture of a user and an output by the output control unit 144.

First, when the first gesture (the gesture of pointing at the chair C) is performed by the user, as shown in FIG. 15A, the product information of the chair C is displayed on the display 136 as the text I (step S130). Additionally, processes up to display of the product information are the same as the processes from step S100 to step S106 described with reference to FIG. 8, and a description thereof will be omitted. In the present embodiment, the product name, the manufacturer, and the product price of the chair C are displayed, as shown in FIG. 15A.

Next, the recognition unit 142 determines whether the fourth gesture of the user is recognized or not (step S131). The fourth gesture here is a gesture which acts as a trigger for starting the registration process by the processing unit 146. As shown in FIG. 15B, in the present embodiment, the fourth gesture is a gesture of turning up a thumb in a state where the text I is displayed. Additionally, details of the fourth gesture are not limited thereto, and may be freely set by the user. For example, a gesture of pointing at a product, for which watch list registration is desired to be performed, with a thumb may be used.

When the fourth gesture of the user is recognized by the recognition unit 142 (step S131: Yes), the processing unit 146 performs the registration process of registering the product in a watch list (step S132). Specifically, the processing unit 146 performs a process of adding the product information of the chair C in a watch list stored in the storage unit 145.

In the case where the fourth gesture of the user is not recognized by the recognition unit 142 (step S131: No), the recognition unit 142 performs the determination process again (step S131).

Then, the output control unit 144 performs a display on the display 136 indicating completion of the registration process (step S133). As shown in FIG. 15A, in the present embodiment, a heart is displayed together with the text I, and when the chair C is registered in the watch list, display of the heart is changed to black, as shown in FIG. 15B. Furthermore, as shown in FIG. 15B, a sentence, "Added to watch list", is displayed on the display 136. Processing by the wearable terminal 130 is then ended.

Other Embodiments

Another embodiment of the present invention will be described with reference to FIG. 16 and FIGS. 17A and 17B. In the present embodiment, the server 110 stores, in advance in the storage unit 118, product information including a 3D model of a product. In this case, at the time of displaying the product information on the display 136, the wearable terminal 130 may preferably display the 3D model in an overlapping manner with the product image.

Figure 16:
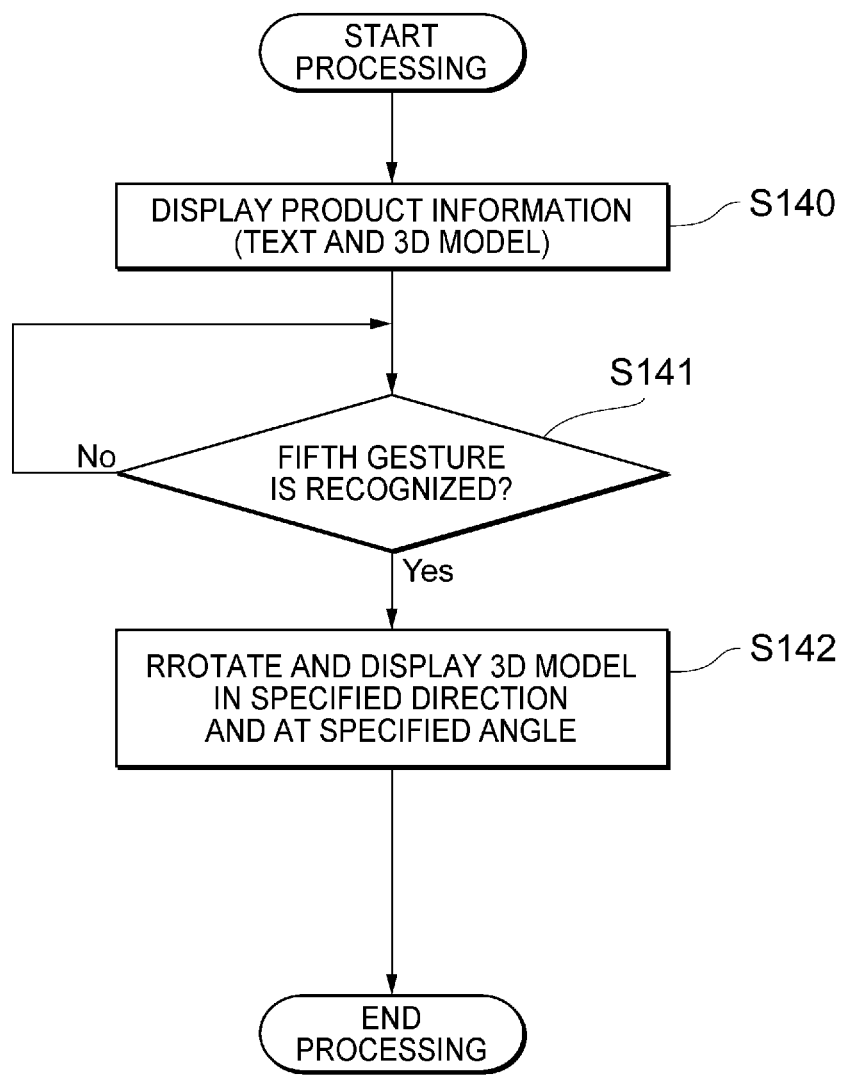
FIG. 16 is a flowchart showing an example of a rotation display process of a 3D model of a product by the wearable terminal.

FIG. 16 is a flowchart showing an example of a rotation process of the 3D model of a product by the wearable terminal 130. FIGS. 17A and 17B are diagrams showing an example of a fifth gesture of a user and an output by the output control unit 144. Additionally, for the sake of description, in FIGS. 17A and 17B, the chair C is shown by a dotted line, and a 3D model M by a solid line.

Figure 17A:
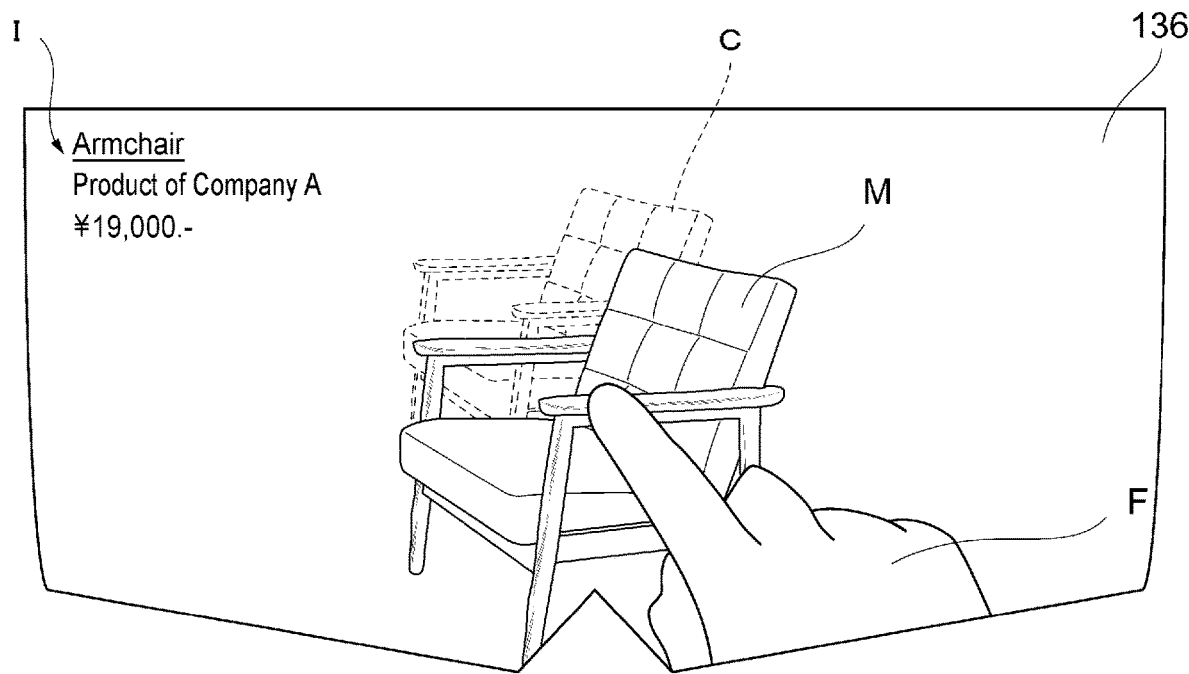
FIGS. 17A and 17B are diagrams showing an example of output by the output control unit performed at a time of the rotation display process.
Figure 17B:
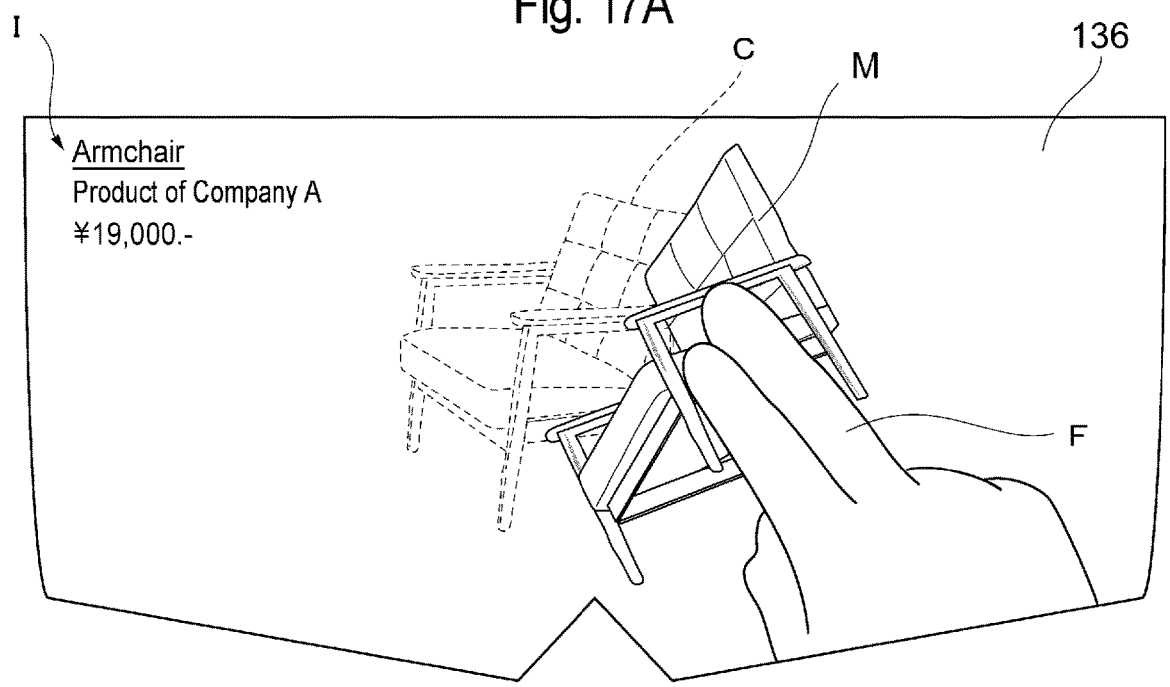

As shown in FIG. 17A, when the first gesture (the gesture of pointing at the chair C) is performed by the user, the product information of the chair C (i.e., the text I and a 3D model M of the product) is displayed on the display 136 (step S140). Additionally, processes up to display of the product information (the text I and the 3D model M) are the same as the processes from step S100 to step S106 described with reference to FIG. 8, and a description thereof will be omitted. Moreover, in the present embodiment, the text I does not necessarily have to be displayed.

Next, the recognition unit 142 determines whether the fifth gesture of the user is recognized or not (step S141). The fifth gesture here is a gesture which acts as a trigger for starting a rotation display process of the 3D model M by the processing unit 146. As shown in FIG. 17B, in the present embodiment, the fifth gesture is a gesture of pointing at the 3D model M with two fingers in a state where the 3D model M is displayed overlapping the chair C, and moving tips of the two fingers in a desired direction of rotation. For example, a rotation angle may be determined according to a rotation speed. Alternatively, the fifth gesture may be a flick input, a swipe input, or pointing of a finger. Additionally, details of the fifth gesture are not limited thereto, and may be freely set by the user.

When the fifth gesture of the user is recognized by the recognition unit 142 (step S141: Yes), the processing unit 146 performs the rotation display process of rotating the 3D model M in a direction and at an angle specified by the user (step S142).

In the case where the fifth gesture of the user is not recognized by the recognition unit 142 (step S141: No), the recognition unit 142 performs the determination process again (step S141). Processing by the wearable terminal 130 is then ended.

Additionally, the rotation display process is not limited to the example described above, and alternatively, only the text I, of the product information, may be displayed in step S140, and the 3D model M may be displayed when the chair C is pointed at with two fingers, for example.

The embodiments described above are for facilitating understanding of the present invention, and are not intended to impose any limited interpretation on the present invention. The elements of the embodiments, and arrangement, materials, conditions, shapes, sizes and the like thereof are not limited to those illustrated, and can be changed as appropriate. Moreover, the elements indicated in different embodiments may be partially exchanged or combined. In the embodiments described above, in the case of the listing process of a product, the product information does not necessarily have to be output. For example, a product in an image may be specified by recognition of the first gesture, and the specified product may be listed on the electronic transaction platform by recognition of the second gesture.

Furthermore, for example, when a product in an image is specified and the product information is displayed based on recognition of the first gesture, the processing unit 146 may perform processes of listing, purchase, acceptance, watch list registration, rotation display, and the like, by recognizing voice commands instead of gestures. In this case, the second to fourth gestures and the acceptance gestures may be replaced by following voice commands.

Second gesture: Sell, Offer, Vend, List
Third gesture: Buy, Purchase, Procure, Buy this
Fourth gesture: Favorite, Register in watch list, Like
Acceptance gesture: Yes, No, OK, Cancel

What is claimed is:
1. A wearable terminal comprising:
a display;
    an image sensor configured to capture a first image comprising a first gesture and a product;
a depth sensor configured to detect a predetermined motion of a seller; and
    a processor, wherein the processor is configured to:
        cause the image sensor to start capturing when the predetermined motion of the seller is detected by the depth sensor;
        recognize the first gesture of the seller specifying the product, based at least in part on the first image, the product owned by the seller;
        acquire product information related to the product specified and related to a listing of the product on an electronic transaction platform for product's purchase and sale, in response to the recognized first gesture, the product information including a listing price when the product is listed on the electronic transaction platform;
        display the product information including the listing price on the display;
        recognize a second gesture of the seller, based at least in part on a second image comprising the second gesture and the product, the second image being captured by the image sensor, wherein the second gesture starts a listing process for listing the product for sale on the electronic transaction platform and wherein the seller has set the second gesture to be used for signaling the start of the listing process; and
        in response to the recognized second gesture of the seller:
            list the product for sale on the electronic transaction platform for the product of which the product information including the listing price is displayed on the display after the image sensor has captured the product, and
set a listing price of the product based on the displayed listing price.

2. The wearable terminal according to claim 1, wherein the listing process further comprises using the product information to list the product for sale.

3. The wearable terminal according to claim 1, wherein the image sensor is further configured to capture a third image including a third gesture and the product, and wherein the processor is further configured to:
recognize the third gesture based at least in part on the third image; and
register the product in a predetermined list in response to the recognized third gesture of the seller.

4. The wearable terminal according to claim 1, wherein the product information of the product is selected via an object used for the first gesture.

5. The wearable terminal according to claim 4, wherein the object is a finger of the seller.

6. The wearable terminal according to claim 4, wherein the processor is further configured to delete the product information from the display, in a case where the object is no longer positioned in a predetermined region in another image captured by the image sensor and the another image is displayed on the display.

7. An information processing terminal comprising:
a depth sensor configured to detect a predetermined motion of a seller;
an image sensor configured to start capturing when the predetermined motion of the seller is detected by the depth sensor;
a recognition unit configured to recognize a first gesture of the seller specifying a product, in a first image captured by the image sensor, the product owned by the seller, and wherein the recognition unit is further configured to recognize a second gesture of the seller, based at least in part on a second image comprising the second gesture and the product, the second image being captured by the image sensor, wherein the second gesture starts a listing process for listing the product for sale on the electronic transaction platform and wherein the seller has set the second gesture to be used for signaling the start of the listing process;
an acquisition unit configured to acquire, in response to the first gesture being recognized by the recognition unit, product information of the product specified and related to a listing of the product on an electronic transaction platform for product's purchase and sale using the first gesture, based at least in part on the image where the first gesture is recognized, the product information including a listing price when the product is listed on the electronic transaction platform;
an output control unit for controlling an output of the product information to the seller; and
a processing unit configured to:
list, in response to the recognized second gesture of the seller, the product for sale on the electronic transaction platform while the image sensor is capturing the product, and
set a listing price of the product based on a displayed listing price.

8. The information processing terminal according to claim 7, wherein the listing process further comprises using the product information to list the product for sale.

9. The information processing terminal according to claim 8, wherein the image sensor is further configured to capture a second image including a second gesture and the product, and wherein the processor is further configured to:
recognize the second gesture of the seller based at least in part on the second image; and
perform the listing in response to the recognized second gesture.

10. The information processing terminal according to claim 7, wherein the listing process further comprises starting a purchase process to purchase, on the electronic transaction platform, another product recognized by the first gesture, wherein the image sensor is further configured to capture a third image including a third gesture and the product, and wherein the processor is further configured to:
recognize the third gesture based at least in part on the third image; and
accept to purchase the another product in response to the recognized third gesture.

11. The information processing terminal according to claim 7, wherein the image sensor is further configured to capture a fourth image including a fourth gesture and the product, and wherein the processor is further configured to:
recognize the fourth gesture based at least in part on the fourth image; and
register the product in a predetermined list in response to the recognized fourth gesture of the seller.

12. A method performed by an information processing apparatus, the method comprising:
detecting, using a depth sensor, a predetermined motion of a seller;
capturing an image when the predetermined motion of the seller is detected by the depth sensor;
recognizing a first gesture of the seller specifying a product, in the image, the product owned by the seller;
acquiring product information of the product specified and related to a listing of the product on an electronic transaction platform for product's purchase and sale using the first gesture, based at least in part on the image where the first gesture is recognized, the product information including a listing price when the product is listed on the electronic transaction platform;
controlling an output of the product information to the seller;
recognizing a second gesture of the seller, based at least in part on a second image comprising the second gesture and the product, the second image being captured by an image sensor, wherein the second gesture starts a listing process for listing the product for sale on the electronic transaction platform and wherein the seller has set the second gesture to be used for signaling the start of the listing process; and
in response to the recognized second gesture of the seller:
listing the product for sale on the electronic transaction platform while the image sensor is capturing the product, and
setting a listing price of the product based on a displayed listing price.

13. The method according to claim 12, wherein the listing comprises using the product information to list the product for sale.

14. The method according to claim 12, further comprising:
capturing a third image including a third gesture and the product;
recognize the third gesture based at least in part on the third image; and register the product in a predetermined list in response to the recognized third gesture of the seller.

\* \* \* \* \*